J. H. CARR.
PLATFORM WHEEL.
APPLICATION FILED MAY 12, 1913.
1,107,492. Patented Aug. 18, 1914.
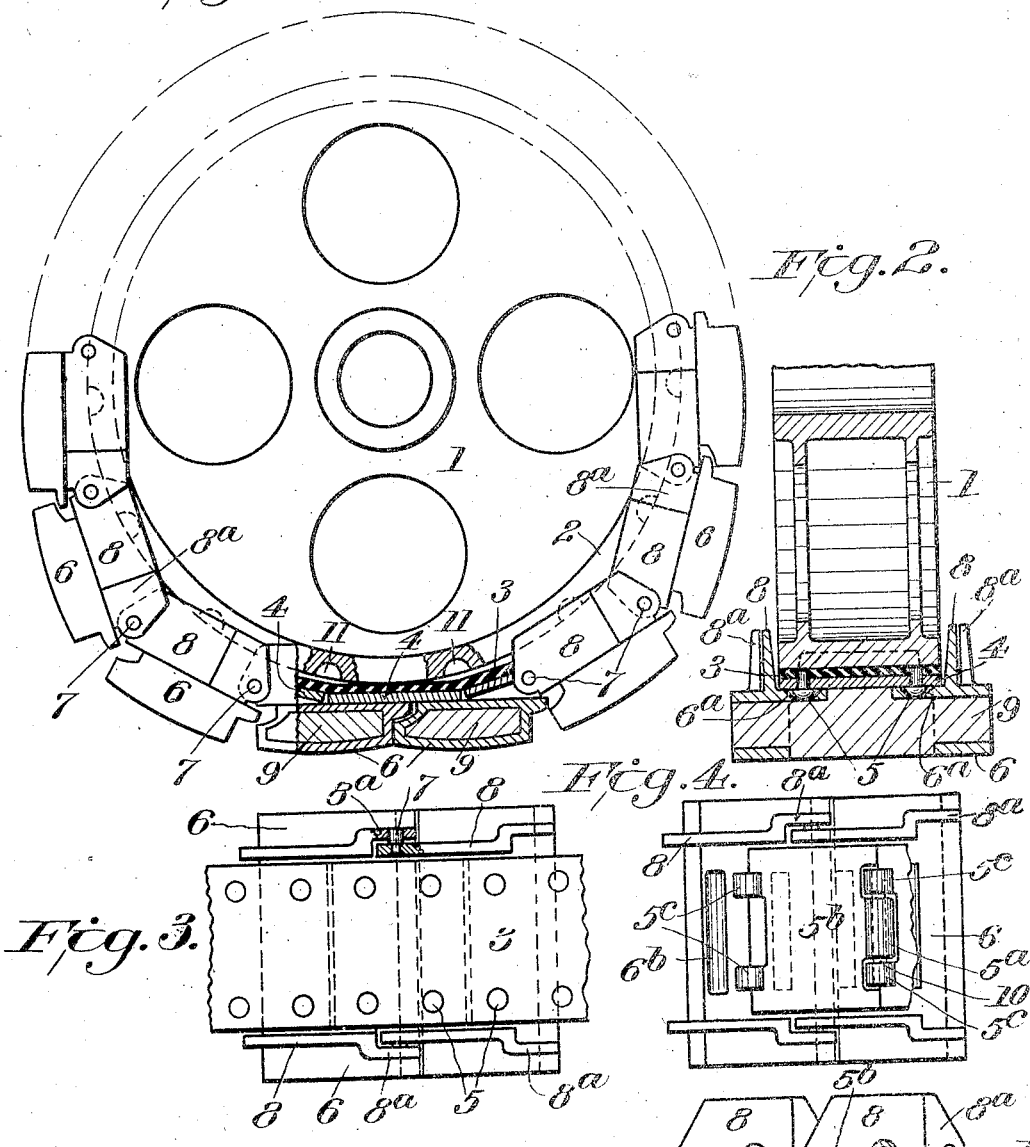
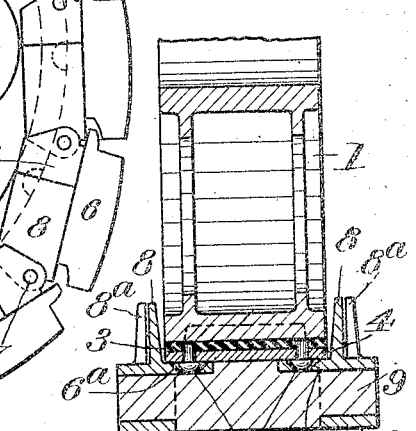
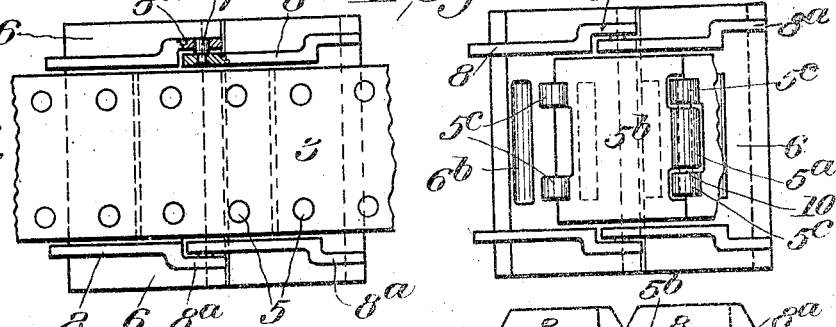
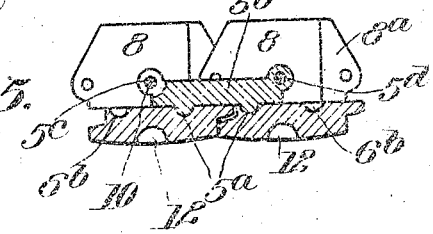
Witnesses:
E. Williams
C. N. Walker
Inventor
John H. Carr
By Chas. E. Riordan
Attorney

UNITED STATES PATENT OFFICE.

JOHN H. CARR, OF ALHAMBRA, CALIFORNIA.

PLATFORM-WHEEL.

1,107,402.　　　Specification of Letters Patent.　　Patented Aug. 18, 1914.

Application filed May 12, 1913. Serial No. 767,605.

*To all whom it may concern:*

Be it known that I, JOHN H. CARR, a citizen of the United States, residing at Alhambra, in the county of Los Angeles and State of California, have invented certain new and useful Improvements in Platform-Wheels, of which the following is a full, clear, and exact specification.

This invention relates to wheels for wagons, traction engines and other vehicles employing an endless flexible platform or track on which the wheel proper moves and which progresses with the wheel.

One object of the present invention is to provide a platform or track of light weight and simple construction which may be applied to ordinary wagon wheels without the use of specially formed tires or rims.

Another object is to produce an improved structure to be used with a special tire or rim on self-propelled vehicles, such as motor trucks, where the drive is transmitted through the band or chain interposed between the flexible platform or track and the wheel.

Other objects will become apparent as the description proceeds.

The invention will be first hereinafter described in connection with the accompanying drawings, which constitute a part of this specification, and then more specifically set forth in the claims at the end of the description.

In the accompanying drawings in which similar reference characters are used to indicate corresponding parts throughout the several views: Figure 1 is a partial side elevation of a traction wheel equipped with one form of my improved flexible platform or track, parts being shown in section; Fig. 2 is a transverse sectional view; Fig. 3 is an inner plan view of a part of the flexible platform or track and the band which is interposed between said platform or track and the rim of the wheel, and Figs. 4 and 5 are detail plan and sectional views respectively of a modified structure for the band or chain and flexible track, especially designed for use on motor trucks, &c., where the drive is through said chain or band.

Referring first to Figs. 1, 2 and 3, the wheel 1 may be of any ordinary construction and may or may not be equipped with a plain straight-faced tire or rim, notwithstanding the fact that for convenience said wheel is shown in Fig. 1 as provided with a special rim 2 designed for use with the modified form of chain and track illustrated in Figs. 4 and 5, to be hereinafter described. For the purposes of the structure illustrated in Figs. 1, 2 and 3, the tire, if one is used, may be of the common flat type.

A strong endless band or belt 3 of rubber, leather, or other suitable material, is slung around the wheel and exceeds in length the circumference of the wheel preferably by about one-tenth of the latter, whereby said band extends loosely around the periphery of the wheel. To the outside of this belt are riveted, at a uniform pitch, a series of rigid steel plates or links 4 fitting closely end to end. The heads 5 of the rivets, which secure said plates or links to the band, project from the outer surfaces of the plates or links and serve to effect an intermeshing connection between the latter and the shoes 6 of the flexible platform or track, as shown best in Fig. 2, said shoes being provided with corresponding cavities or depressions 6ª in their inner faces.

The shoes 6 are hinged end to end as at 7 to form the endless platform or track, the hinges being placed in lateral flanges 8 which extend inward far enough to overlap the rim of the wheel and therefore serve to retain the band 3 in proper position and to exclude dirt and mud. In order to effect the hinge connection between the flanges 8, each is slightly offset at one end, as at 8ª, so as to overlap the adjacent end of the other, as best shown in Fig. 3. The shoes are preferably made broad to increase the width of the tread of the device, and in order to lighten said shoes, they are made in skeleton form and fitted with wooden blocks 9 or other suitable filling material, Figs. 1 and 2.

As shown the length of the shoes is a trifle longer than the length of the plates 4 on the band, and in such case there are the same number of shoes in the endless track as there are plates on the band. It is obvious, however, that various modifications in this respect may be made without departing from the spirit and scope of the invention as set forth in the appended claims. This permits two of the shoes to lie flat on the road bed below the wheel. The endless platform or track and band are so positioned with respect to each other that one of the plates 4 will always bridge the two shoes which lie flat under the wheel, whereby the load will be evenly distributed between said shoes, the intermeshing of the rivet heads 5 and recesses 6ª serving to maintain this relative position when once started in such relation.

In the modifications illustrated in Figs. 4 and 5, the shoes have flanges 8, hinged together as already described, but instead of the recesses 6ª long grooves 6ᵇ are formed in said shoes to be engaged by corresponding ribs or cogs 5ª on links 5ᵇ of an endless chain which in this construction is substituted for the belt 3 and plates 4 of the first form. The links 5ᵇ are hinged together end to end, the hinges proper projecting inwardly in the form of ribs or cogs composed of lugs 5ᶜ and 5ᵈ on the meeting ends of each pair of adjacent links, see Fig. 4. These lugs are connected by pins 10. The ribs or cogs formed by the hinges are adapted to intermesh with grooves 11 in the rim or tire of the wheel, Fig. 1, thus providing a positive driving connection between the chain, composed of the links 5ᵇ, and the wheel, which positive connection is necessary when the wheel is to be driven by the chain, as in motor trucks. The flanges on the shoes exclude dirt and mud from the chain and also keep said chain in proper position on the wheel, as in the construction illustrated in Figs. 1 to 3 inclusive. The bottom surface of each of the shoes may be made convex, as at 12, Fig. 5, to prevent skidding and also reduce their weight.

Having thus described my invention, what I claim as new and desire to secure by Letters Patent of the United States is:

1. In a structure of the character described the combination with a rotary member, of an endless shoe member loosely surrounding the same, and comprising shoes hinged end to end, a separate endless flexible band interposed between the rotary member and the shoe member, and rigid plates fastened to the outer surface of said band and adapted to engage the shoe member.

2. In a structure of the character described the combination with a rotary member, of an endless shoe member loosely surrounding the same, and comprising shoes hinged end to end, an endless flexible band interposed between the rotary member and the shoe member, rigid plates fastened to the outer surface of said band and adapted to engage the shoe member, and intermeshing means on said plates and shoes whereby they are detachably interlocked.

3. In a structure of the character described the combination with a rotary member, of an endless shoe member loosely surrounding the same, and comprising shoes hinged end to end, and having recesses in their inner faces, an endless band interposed between the rotary member and the shoe member, and rigid plates riveted to the outer surface of said band, the heads of the rivets protruding on the outer faces of said plates and adapted to engage the recesses in the shoes.

In testimony whereof I have signed my name to this specification in the presence of two attesting witnesses.

JOHN H. CARR.

Witnesses:
C. V. GRAHAM,
E. L. McLEAN.